Patented June 13, 1950

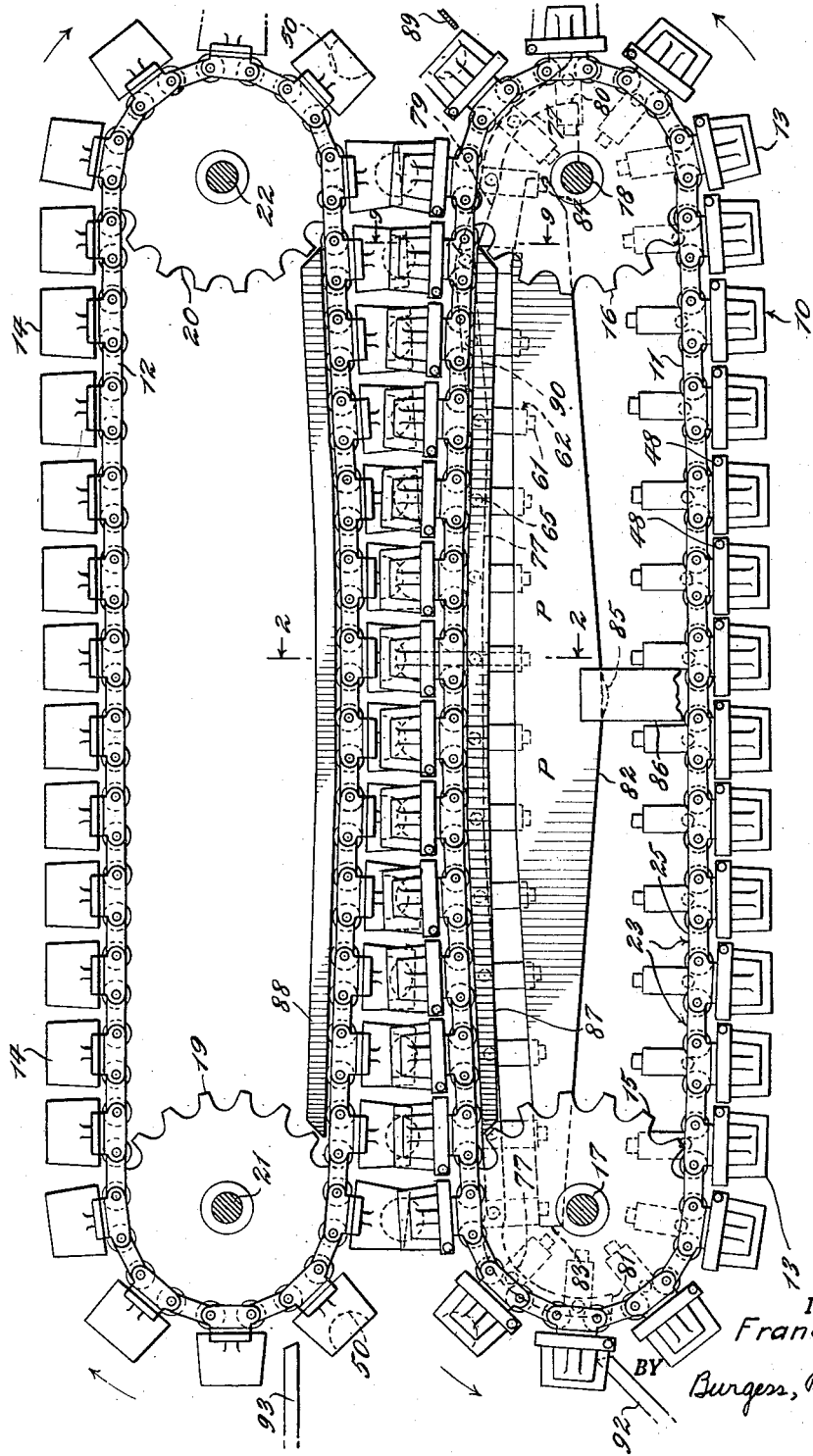

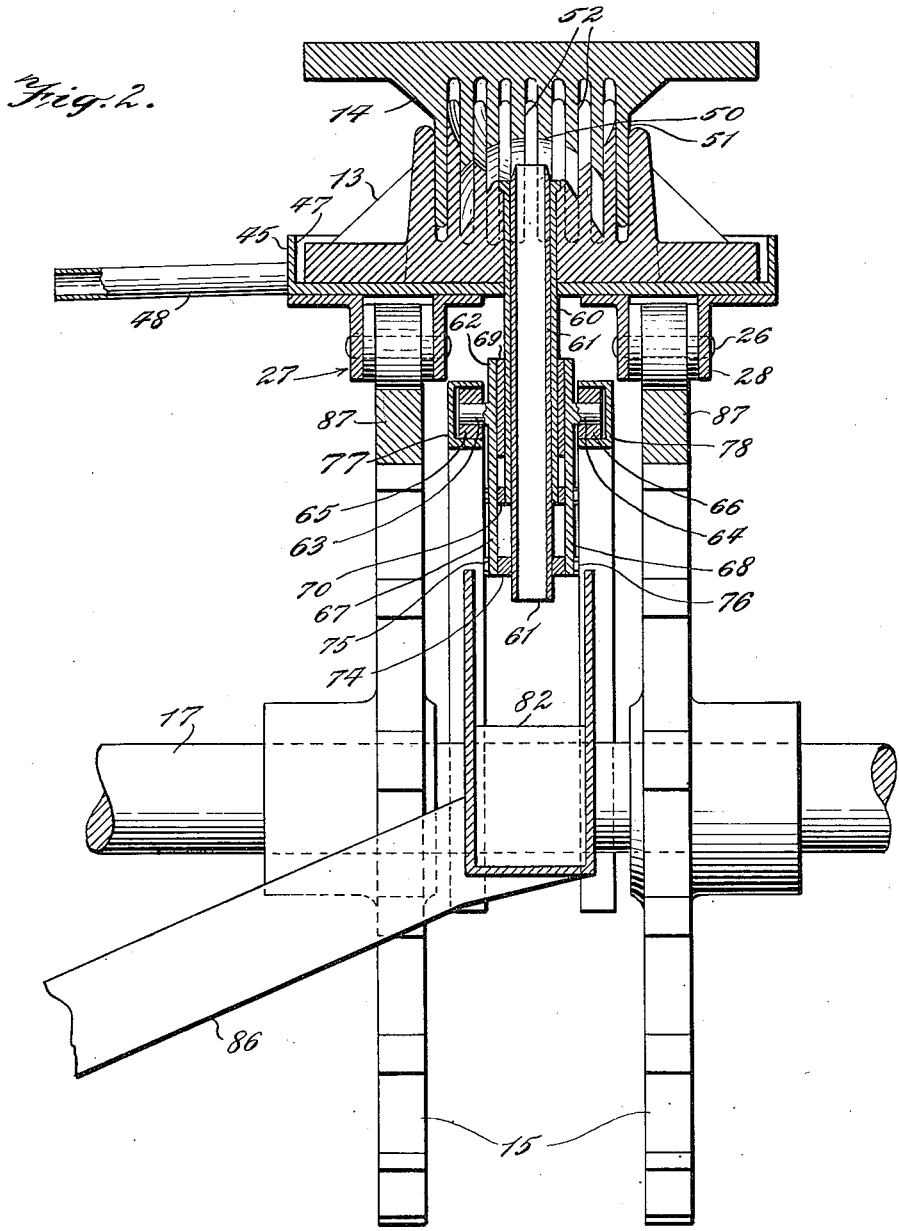

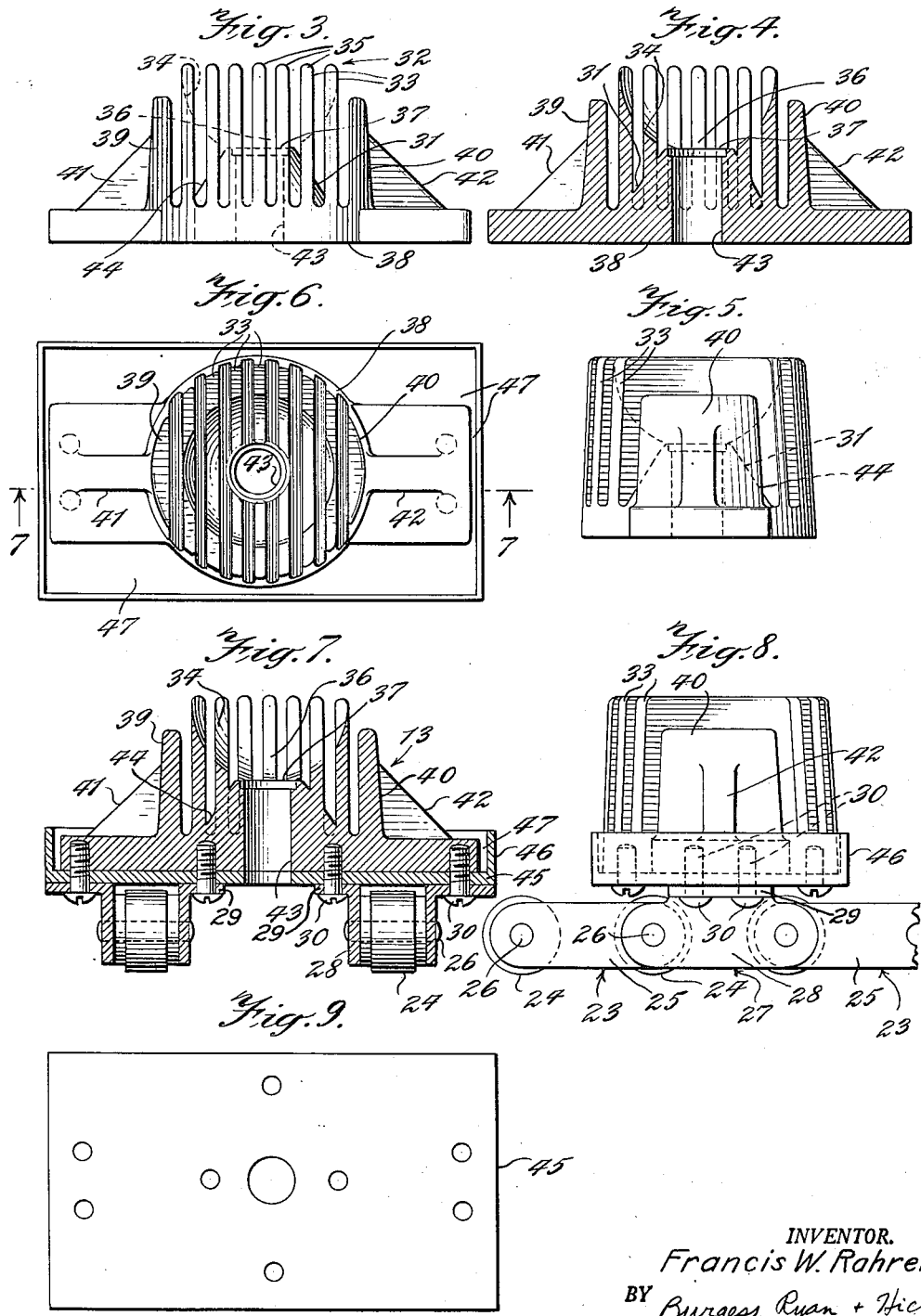

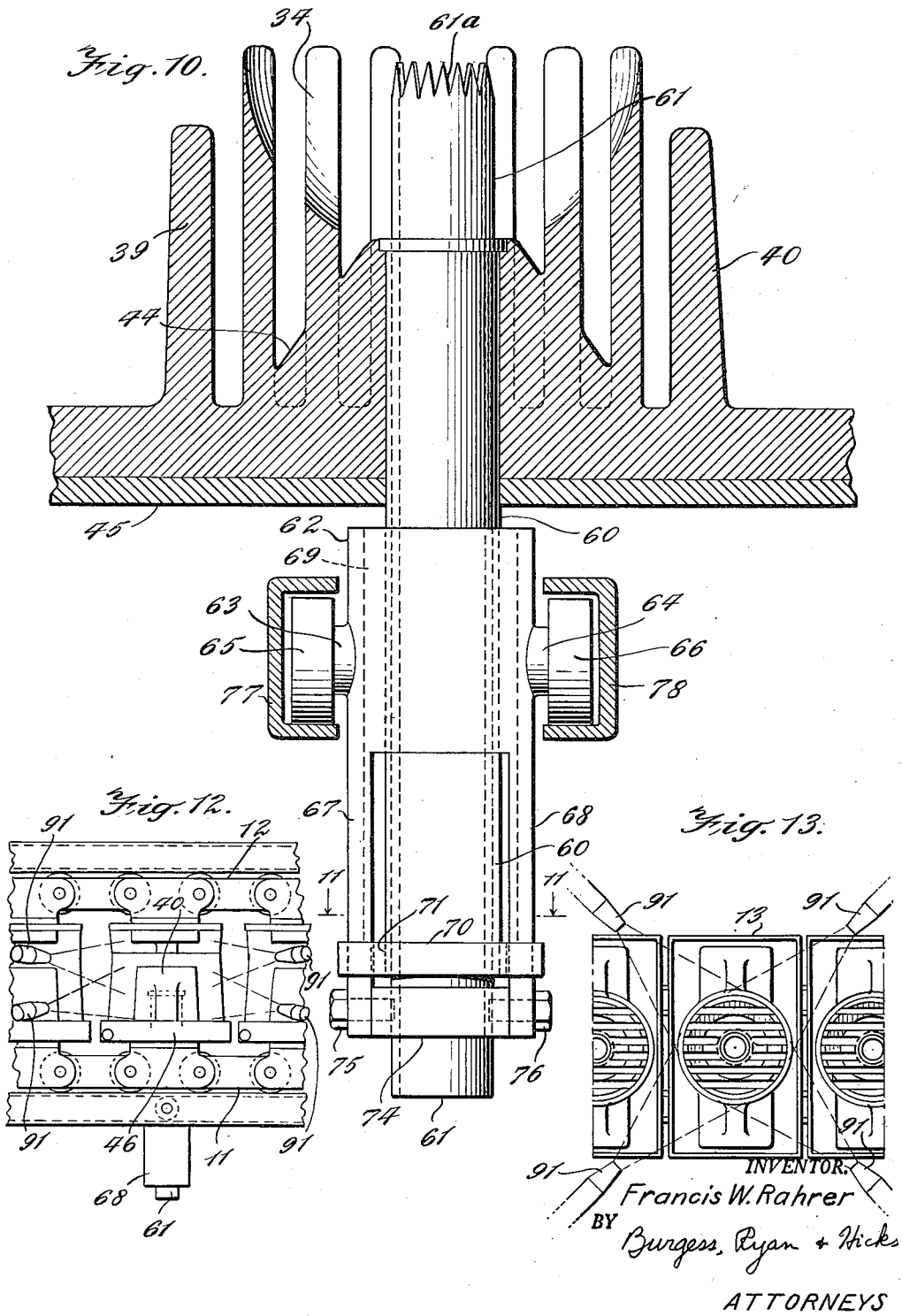

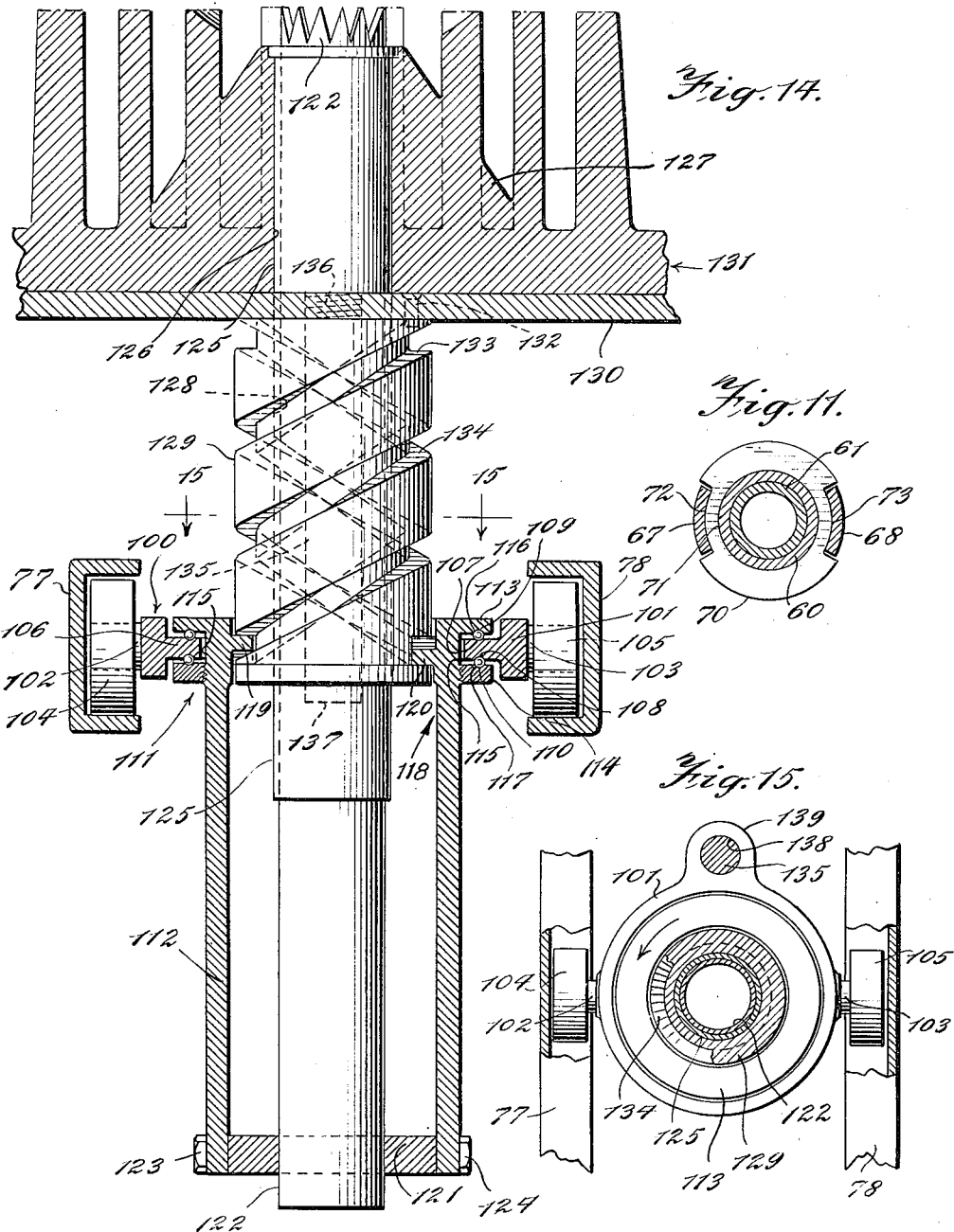

2,511,374

UNITED STATES PATENT OFFICE 2,511,374

APPARATUS FOR REMOVING JUICE FROM FRUIT

Francis W. Rahrer, Lakeland, Fla.

Application September 20, 1947, Serial No. 775,335

11 Claims. (Cl. 100—35.)

1

This invention relates to improvements in the art of extracting juice from fruit and more particularly to an apparatus for and method of dejuicing citrus and like fruits.

It has been difficult heretofore to obtain citrus fruit juice uncontaminated by rind oil and other undesirable flavoring substances. Unless these contaminants are removed, the taste of the juice is impaired and the juice itself tends to age quickly and thus become more unpalatable. A common disadvantage of many dejuicing methods and machines in this respect is that they employ so much pressure to express the juice from the fruit that relatively large amounts of rind and pulp oil are inevitably produced, and, frequently, no effort is made to prevent such materials from mingling with the juice.

A principal object of the invention is to extract juice from fruit by compression means and to recover it in a form uncontaminated by rind oil and other unwanted flavors. Another object is to improve the yield of juice and to employ less pressure for extracting the juice than has usually been considered necessary. A further object is to collect separately from the juice any rind oil formed during the compression of the fruit. Other objects and advantages will appear hereinafter.

The invention may be understood by referring to the accompanying drawings in which is illustrated a preferred form of apparatus and method, and in which:

Fig. 1 is a side elevation, with some parts broken away, of an apparatus for receiving, dejuicing, and discharging fruit;

Fig. 2 is an enlarged sectional view, with some parts omitted, taken along the line 2—2 of Fig. 1;

Fig. 3 is an enlarged side view of a detached fruit holder of the kind shown in the lower part of Fig. 1;

Fig. 4 is a central, longitudinal section of the fruit holder of Fig. 3;

Fig. 5 is an end view of the fruit holder shown in Fig. 3;

Fig. 6 is an enlarged plan view of a holder mounted as shown in the lower part of Fig. 1;

Fig. 7 is a section taken along the line 7—7 of of Fig. 6;

Fig. 8 is an end view of the holder of Fig. 6;

Fig. 9 is a bottom view of the holder of Fig. 6 with the chain omitted;

Fig. 10 is an enlarged sectional view along the the line 9—9 of Fig. 1 with parts of the construction omitted;

Fig. 11 is a section along the line 11—11 of Fig. 10;

2

Fig. 12 is an enlarged partial view of a modification of the structure shown in Fig. 1;

Fig. 13 is a plan view of Fig. 12 with part of the construction omitted;

Fig. 14 is a view somewhat similar to Fig. 2, but only partly in section and showing a modified construction; and Fig. 15 is a sectional view taken along the line 15—15 of Fig. 14.

Generally speaking, the invention provides a means for dejuicing fruit of the citrus variety by continuously and consecutively advancing the fruit in a series of individual fruit holders and progressively compressing it in the holders as it advances. One or more consecutive lines or streams of advancing fruit may be handled, although for simplicity the invention is illustrated and will be described in connection with only one. Means are provided at the beginning or initial stage of the compressing action for forming an opening in the fruit by piercing the rind and for severing the interior pulp structure. Means are then provided for withdrawing fruit juice through the opening throughout the progress of the compressing action and for separately withdrawing any rind oil formed. The juice withdrawal means may comprise a conduit member or tube, preferably inserted in the fruit coincidently with the piercing and severing of the same and later partially retracted to the bottom portion of the fruit, say to a point where it penetrates through the rind, to catch the juice expressed from the fruit.

Referring to the drawings, the invention will be seen as comprising a series of individual fruit holders generally designated as 10, and preferably as shown in Fig. 1, mounted on a pair of continuously movable endless chains 11, 12, the direction of movement being represented by the arrows. The lower holders 13 of the lower chain differ somewhat from the upper holders 14 of the upper chain, as will be later described. Chain 11 is disposed around pairs of sprocket wheels 15, 16 which are mounted on the shafts 17, 18, respectively, while chain 12 is supported on pairs of sprocket wheels 19, 20, which in turn are mounted on the shafts 21, 22. Suitable means (not shown) are provided for supporting and driving the upper and lower shafts. The chain is of the roller type having alternate links 23 (Figs. 1, 2, 7, and 9), comprising a pair of rollers 24 held between side plates 25 by pins 26. The other links 27 have L-shaped side plates 28 for mounting the fruit holders thereto. As shown in Figs. 7 and 8, the bracket portions 29 of side plates 28 are suitably drilled to permit them to be secured to the holder 13 by screws 30. It will be noted that the fruit holders are mounted on alternate links of the chains.

As shown, the chains are positioned to travel relatively to each other in a fruit-compressing path, the upper and lower holders being engageable with each other in a fruit-compressing relation throughout this path. The amount of pressure on the fruit progressively increases as the chains and holders approach each other in the right hand side of Fig. 1 and progressively decreases as they travel away from each other in the left hand side of the figure. The greatest pressure is exerted at the central portion of the chains, say over the distance designated as P—P in Fig. 1, in which position the chains are nearest and substantially parallel to each other and the upper and lower holders are fully meshed.

Each of lower holders 13 comprises a fruit seat 31 of generally frusto-conical shape (Figs. 3–8) intersected by a series or group 32 of upstanding, spaced, parallel fins or finlike members 33 of a greater height than the fruit seat. The series of finlike members has a generally cylindrical outline and is slightly tapered from bottom to top, as shown in Figs. 5 and 8. The series has a central cavity 34 extending inwardly of the free ends 35 of said members to form a fruit receptacle which at the base 36 thereof merges into the upper fruit-receiving portion 37 of the fruit seat. The fruit seat and the fruit-supporting finlike members have a common base portion 38, as shown in Fig. 4. The end members 39, 40 of the series 32 are joined to the base portion by brackets 41, 42. A central bore 43 extends axially through the seat 31, opening through substantially the entire area of the upper portion 37. Seat 31 is bounded by the conically shaped walls 44, which slope downwardly from the top or upper portion 37 and which are intersected by the finlike members 33. As shown in Figs. 6 and 7, the fruit holder may be disposed in a rectangularly shaped supporting member 45 having an upstanding wall 46 which completely encloses the fruit holder. A channel 47, formed between the holder and the supporting or containing member 45, surrounds the holder. Member 45 is also provided with a pipe 48 (Figs. 1 and 2) opening through an end wall thereof.

The upper holders 14 are similar to the lower holders except that their fruit seats or supports 50 (Figs. 1 and 2) are not bored and the holders are not supported in a walled container. If desired, however, walled containers may be provided for the upper holders. The circular groups 51 (Fig. 2) of finlike members 52 of the upper holders are substantially the same as those of the lower holders except that the latter have one more finlike member.

As corresponding pairs of upper and lower holders approach each other in order to compress the fruit in the lower holder, the finlike members of each holder intermesh, the members of one holder slipping between the fin spaces of the other.

The bore 43 of each fruit seat 31 is provided with a guide tube 60 (Figs. 2 and 10) through which a hollow or channeled fruit puncturing member 61 is movable back and forth and into the rind and pulp structure of the fruit for varying distances. Puncturing member 61 has a serrated cutting end 61a. Means are provided for movably supporting each said puncturing member, such means being normally operative throughout the fruit-compressing path to support the puncturing member in a rind-penetrating position relative to the fruit. Means are also provided adjacent the beginning of the fruit compressing path for actuating or rendering the last means momentarily operative to move the puncturing member a substantial distance through the rind and into the fruit to sever the pulp structure of the same. In the form shown, and as is preferred, the puncturing member supporting means may be a sleeve-like member 62 having a pair of shafts 63, 64 mounted adjacent the upper end thereof which carry rollers 65, 66. The upper portion of the member 62 is tubular in form while the lower portion comprises a pair of arms 67, 68 of slightly concave cross-section. A bearing sleeve 69 is provided in the tubular portion of member 62, being immovably fixed thereto. Sleeve 69, in turn, is slidable longitudinally but not rotatably of the guide tube 60, the sleeve being suitably mounted to the guide tube for this purpose, as by a keyed or splined connection (not shown). A guide 70 is fixed to the lower end of the guide tube, as by brazing, as indicated at 71 (Fig. 10). The guide is provided with a pair of oppositely arranged notches 72, 73 (Fig. 11), in which the arms 67, 68 of sleeve or roller member 62 are disposed for sliding movement. Member 62 is connected to the puncturing tube 61 by means of a ring 74 to which each arm 67, 68 is attached as by means of screws 75, 76, which engage the tube, as shown in Fig. 10.

The rollers 65, 66 of member 62 are disposed for travel in a pair of partially enclosed tracks 77, 78, by which means the member 62 is rendered normally operative throughout the fruit-compressing path to support the puncturing member 61 in a rind-penetrating position relative to the fruit. Means in the form of cam surfaces 79 (Fig. 1) on the tracks 77, 78 adjacent the beginning of the fruit compressing path serve to render the roller or track-traversing member 62 momentarily operative to move the puncturing member 61 a substantial distance into the fruit in order to form an opening therein and to sever the pulp structure. As shown in Fig. 1, the track 77 has a flared entrance 80 for engaging the rollers of the member 62 at a point a little in advance of the engagement of the fruit holders. Track 78 has a similar entrance (not shown). The tracks 77, 78 extend the entire length of the fruit compressing path and terminate at a point indicated at 81. They are supported on the shafts 17, 18 by suitable means (not shown).

A fruit juice reservoir 82, extending the length of the friut-compressing path, is disposed immediately below the members 62 and may be suitably supported upon the shafts 17, 18 by means not shown. The reservoir slopes downwardly from each end 83, 84 towards the center 85, where the juice is collected and then drawn off through the conduit 86. The ends of the reservoir are open, at least in the upper portions thereof, to enable the lower portions of the puncturing tubes 61 and members 62 to clear them.

Means for supporting the upper and lower chains along the fruit-compressing path are provided in the form of tracks or roller chain supports 87, 88 (Figs. 1 and 2) to aid in maintaining the holders in fruit-compressing relation.

In the operation of the machine, fruit is fed to a lower holder via the chute 89. Thereafter the fruit supporting holder is engaged by a corresponding holder on the upper chain and the fruit is gripped between them. As the lower holder approaches the fruit compressing path, which may generally be defined as the distance between the inner or near edges of, say, the lower sprocket wheels, the roller member 62 rides up the cam surfaces 79 of tracks 77, 78, and in turn the puncturing member 61 is forced into the fruit a substantial distance. In such movement of the puncturing member, three distinct functions are accomplished: first, an opening is made in the fruit through which the juice may be removed; second, the pulp structure of the fruit is severed so as to require less pressure for extracting the juice; and third, a juice conduit in the form of the puncturing tube is inserted in the opening. As the holders advance, the cam surfaces 99 (Fig. 1) of the tracks 77, 78, over which the roller member 62 moves downwardly, serve to de-actuate said member with respect to the puncturing tube, and as a result the tube is partially withdrawn from the fruit to a point where it just penetrates through the rind. Tracks 77, 78 are so constructed as to render the roller member 62 operative to support the puncturing tube in its rind-penetrating position as long as the fruit is being compressed. The plug or disc of rind which is cut out by the puncturing member sometimes hangs to the pulp inside the fruit and does not interfere with the passage of the juice through the puncturing tube. At other times it may be cut free of the pulp and it then passes through the puncturing tube along with the juice and seeds and is later separated therefrom by means of a strainer.

The juice that is released during the compression of the fruit passes through the puncturing tube and into the reservoir 82. Maximum pressure is applied to the fruit when it traverses the path, generally indicated as P—P on Fig. 1, in which positions the upper and lower chains are substantially parallel. When the fruit has traversed such path, the chains move away from each other and the pressure is decreased. During the time when the greatest pressure is applied to the fruit, rind oil may tend to be expressed from the rind. Such oil will flow downwardly over the surface of the fruit and towards the fruit seat of the lower holder. It does not pass into the puncturing tube because the upper level of the tube is above the top of the seat and above the lowermost portion of the rind. Nor does the oil tend to collect on the top or upper portion 37 of the seat, which is substantially smaller in area than the area of a central cross-section of the fruit. Rather, the oil drains downwardly along the sloping walls 44 of the fruit seat and ultimately finds its way to the base 38 of the holder where it collects in the channel 47 between the holder and the walled supporting member 45. Some of the oil may be intercepted as it flows downwardly over the rind by the upstanding finlike members 33, and it then flows downwardly along these members to the sloping sides 44 of the fruit seat to the peripheral channel 47. The oil may be removed from the channel through pipe 48.

As the fruit holders leave the parallel section P—P of the fruit compressing path, they may be sprayed with water to remove any rind oil from them. For this purpose a number of water sprays 91 may be provided as shown in Figs. 11 and 12. A total of four sprays on each side of the holders may be employed, although of course the number may be varied as desired.

As the holders disengage from each other, the crushed fruit may be removed therefrom by means of the fork members 92, 93 (Fig. 1) which are thin enough to pass between the finlike members 33 of the holders.

The foregoing operation has been described in connection with a single pair of upper and lower holders, but it will of course be appreciated that the other holders operate in the same way in a continuous and consecutive manner.

If desired, the puncturing tube may be rotated as it pierces the fruit in order to improve the cutting action. Suitable means may be provided responsive to movement of the roller member in order to rotate the puncturing tube. Such means, for example, may be responsive to the upward movement of the roller member as it traverses the cam surfaces 79 of tracks 77, 78. As illustrated in Figs. 14 and 15, the roller member in this case may comprise a roller carrier 100, which comprises a ring 101 having a pair of upwardly extending, oppositely disposed shafts 102, 103 carrying rollers 104, 105 for engagement with tracks 77, 78. The ring has an annular step or land 106 which is provided with upper and lower bearing races or grooves 107, 108, in which upper and lower bearings 109, 110 are disposed. Cooperative with the roller carrier is a follower 111 which comprises a cylindrical tube 112 having a pair of flanges 113, 114 at the upper end thereof. Flange 114 may be detachable, as by means of a threaded engagement, to facilitate assembly of the parts. A groove 115 is formed between the flanges for receiving the step 106 of the roller carrier 100. The upper and lower inner surfaces of the flanges have bearing races 116, 117, which cooperate with the races 107, 108, respectively, of the step 106 to retain the bearings 109, 110. The upper inner surface 118 of the follower tube 112 has a pair of oppositely placed guides or keys 119, 120 whose function will presently appear. At the bottom of tube 112 is a ring 121 similar to ring 74 of Figs. 2 and 10, by means of which the follower is secured to the puncturing tube 122 as by screws 123, 124.

The puncturing tube, which is similar to tube 61 of Figs. 2 and 10, is movable in guide tube 125, which is fixedly disposed in the bore 126 of fruit seat 127. The lower portion of the guide tube is disposed in the bore 128 of the double threaded screw member 129, which is mounted to the plate or supporting member 130 of fruit holder 131 as by means of the screw 132. The keys 119, 120 of the follower are engaged in the grooves 133, 134, respectively, of the screw member, as shown, and are adapted to travel upwardly in the grooves in response to suitable urging.

In operation, when the roller carrier 100 approaches the cam surfaces 79 of tracks 77, 78 (note Fig. 1), it begins to move upwardly, and in turn exerts an upward thrust on the follower 111, which is thus urged to turn or rotate about the screw member by virtue of the engagement of the keys 119, 120 in the grooves 133, 134. As is evident, the follower also rotates relative to the roller carrier by virtue of the ball bearing connection. In this manner, as long as the roller carrier moves up the cam surfaces, the follower will rotatably ascend the screw member. Since the follower is secured to the puncturing tube, the latter is rotatably moved through the seat bore and into the fruit. The screw member is so threaded as to provide ¾ to one turn of the puncturing tube as it advances into the fruit.

In order to prevent the roller carrier from turning during its upward passage over the cam surfaces, a rod 135 is provided which at its upper end 136 may be threaded or otherwise secured to the plate 130 of the fruit holder. At its lower end 137 the rod is slidably disposed in the bore 138 (Fig. 15) of the bracket or support 139 attached to the ring 101 of the roller carrier.

It will be appreciated that while the invention has been described in connection with a preferred embodiment, it is capable of various modifications within the scope thereof.

In the light of the foregoing description, the following is claimed:

1. A machine for removing juice free of rind oil and other contaminants from citrus fruit which comprises a continuously movable endless chain of individual fruit holders, each of said holders comprising a centrally bored fruit seat surrounded by a fruit receptacle; a second continuously movable endless chain of individual fruit holders, each of which holders comprises a fruit support surrounded by a fruit receptacle engageable with said first receptacle; said second endless chain being positioned to travel in a progressive fruit-compressing path relative to said first chain, corresponding holders of each chain being (1) movable towards each other at the beginning of said fruit-compressing path, (2) engageable with each other in fruit-compressing relation throughout said path, and (3) movable away from each other at the end of said path; means for supporting the holders of both chains during the time they are in engagement with each other; a hollow fruit-puncturing member movable back and forth through each said seat bores and into the fruit; track means spaced below said seat bores and having a cam surface adjacent the start of the fruit-compressing path; track traversing means movably supporting each said puncturing member and responsive to said cam surface for moving the puncturing member through the fruit seat bore of each holder and into the fruit; and means for partially withdrawing the puncturing member from the fruit after the latter has been punctured, said hollow puncturing member serving to carry off juice from the interior of the fruit as the latter is progressively compressed between the holders of said chains.

2. In a machine for removing the juice from citrus fruit comprising a first continuously movable endless chain of individual fruit holders, each of said holders comprising a fruit seat; a second continuously movable endless chain of individual fruit holders, each of which holders comprises a fruit support; said second endless chain being positioned to travel in a progressive fruit-compressing path relative to said first chain, and in which corresponding holders of each chain are (1) movable towards each other at the beginning of said fruit-compressing path, (2) engageable with each other in fruit-compressing relation throughout said path, and (3) movable away from each other at the end of said path, the combination therewith of: fruits seats for said first holders each having a central bore therethrough; a hollow rotatable fruit-puncturing member movable back and forth through each said seat bore and into the fruit; means movably attached to each said puncturing member and operative to rotatably move said member through the fruit seat bore and into the fruit; means adjacent the beginning of said fruit-compressing path for rendering said movable means momentarily operative to simultaneously rotate and move said puncturing member a substantial distance into the pulp structure of the fruit; and means extending along said fruit-compressing path for rendering said movable means operative to move said puncturing member to, and maintain it in, a rind-penetrating position; said hollow puncturing member serving to carry off juice from the fruit as the latter is progressively compressed between the holders of said chains.

3. In a machine for removing the juice from citrus fruit comprising a first continuously movable endless chain of individual fruit holders, each of said holders comprising a fruit seat; a second continuously movable endless chain of individual fruit holders, each of which holders comprises a fruit support; said second endless chain being positioned to travel in a progressive fruit-compressing path relative to said first chain, and in which corresponding holders of each chain are (1) movable towards each other at the beginning of said fruit-compressing path, (2) engageable with each other in fruit-compressing relation throughout said path, and (3) movable away from each other at the end of said path, the combination therewith of: fruit seats for said first holders each having a central bore therethrough; a hollow fruit-puncturing member movable back and forth through each said seat bore and into the fruit; means movably attached to each said puncturing member and operative to move said member through the fruit seat bore and, for varying distances, into the fruit; means adjacent the beginning of said fruit-compressing path for rendering said movable means momentarily operative to move said puncturing member a substantial distance into the pulp structure of the fruit; and means extending along said fruit-compressing path for rendering said movable means operative to move said puncturing member to, and maintain it in, a rind-penentrating position; said hollow puncturing member serving to carry off juice from the fruit as the latter is progressively compressed between the holders of said chains.

4. In a machine for removing the juice from citrus fruit comprising a first continuously movable endless chain of individual fruit holders, a second continuously movable endless chain of individual fruit holders, said second endless chain being positioned to travel in a progressive fruit-compressing path relative to said first chain, and in which corresponding holders of each chain are engageable with each other in fruit-compressing relation throughout said path, the combination therewith of: holders for said first chain each having a central bore therethrough; a channeled fruit-puncturing member movable back and forth through each said bore and into the rind and pulp structure of the fruit; means movably supporting each said puncturing member and normally operative throughout said fruit-compressing path to support the said member in a rind-penetrating position relative to the fruit, and means adjacent the beginning of said fruit-compressing path for rendering said movable means momentarily operative to move the puncturing member a substantial distance through the rind and into the fruit to sever the pulp structure of the same, said channeled puncturing member serving to carry off juice from the fruit as the latter is progressively compressed between the holders of said chains.

5. In a machine for removing the juice from citrus fruit uncontaminated with rind oil comprising an upper and a lower continuously movable, endless chain of individual fruit holders, said chains being positioned relatively to each other to support and to progressively compress fruit between corresponding holders thereof, the improvement which comprises: lower holders each having centrally bored fruit seats of generally frusto-conical shape, each said seat being intersected by a series of upstanding, spaced, finlike members of greater height than said seat, said series of finlike members having a central cavity extending inwardly of the free ends of the members to form a fruit receptacle which at the base thereof merges into the top of said fruit seat, the conically shaped sides of the fruit seat and the spaces between said members serving to drain any rind oil formed during the compression of the fruit; a peripheral channel at the base of each said lower holder for receiving rind oil from said spaces and seat sides; means for withdrawing rind oil from each said channel; means operating through said seat bores for forming an opening in each fruit and for coincidentally severing the internal pulp structure thereof at the initial stage of the fruit compressing action; and means for inserting a fruit juice conduit in said opening a distance just sufficient to penetrate through the rind of the fruit.

6. In a machine for removing the juice from citrus fruit comprising an upper and a lower continuously movable, endless chain of individual fruit holders, each of said holders comprising a central fruit seat and means for supporting fruit thereon, said chains being positioned to hold and to progressively compress fruit between corresponding holders thereof, the improvement which comprises: lower holders having a central bore in the fruit seat thereof, guide means mounted in each said bore, a hollow fruit-puncturing member movable in said guide means and through said seat bore for puncturing each fruit including the rind and pulp structure thereof, means movable longitudinally of said guide means for supporting said puncturing member in said guide means, means for actuating said movable means to move the puncturing member through the guide means and seat bore and into the fruit at the initial stage of the fruit compressing action, and means for de-actuating said movable means to partially withdraw the puncturing member from the fruit, said hollow puncturing member serving to carry off juice from the fruit as the latter is progressively compressed between the holders of said chains.

7. In a machine for removing the juice from citrus fruit uncontaminated with rind oil comprising a series of individual fruit holders and means for advancing and progressively compressing the fruit in said holders, the improvement which comprises: holders having a centrally bored fruit seat therein, a hollow rotatable fruit-puncturing member movable through each said seat bore for puncturing each fruit including the rind and pulp structure thereof, means spaced adjacent each fruit holder and movable therewith for movably supporting and rotating said puncturing member, means for actuating said spaced means to rotate and move the puncturing member through the seat bore and into the fruit, including the pulp structure thereof, at the initial stage of the fruit compressing action, and means for de-actuating said spaced means to partially withdraw the puncturing member from the fruit, said hollow puncturing member serving to carry off juice from the fruit as the latter is progressively compressed in said holders.

8. In a machine for removing the juice from citrus fruit comprising an upper and a lower continuously movable, endless chain of individual fruit holders, said chains being positioned to hold and progressively compress fruit between corresponding holders thereof, the improvement which comprises a fruit seat in each lower holder comprising an upper fruit-receiving portion having side walls sloping away therefrom, said upper portion being substantially smaller in area than the area of a central cross-section of the fruit, each said fruit seat having a central bore therethrough which opens through substantially the entire area of said upper portion, said sloping walls of the fruit seat serving to drain away any rind oil formed during the compression of the fruit; means for forming an opening in each fruit and coincidently severing the internal pulp structure thereof at the initial stage of the fruit compressing action; and means for inserting a fruit juice conduit through each said bore and into each fruit opening a distance sufficient to penetrate the rind of the fruit.

9. In a machine for dejuicing citrus fruit having channeled holders for receiving and supporting fruit and means for advancing and progressively compressing the fruit in said holders to extract the juice therefrom, the improvement which comprises: a fruit puncturing and juice conduit member on each holder movable in said channel toward and from fruit resting on the holder, each holder being traversable through a fruit compression path, said member being movably supported to move in said path, a first means along the path for moving said member at an initial stage of fruit compression toward the fruit to puncture the rind and pulp structure thereof, and a second means along the path and adjacent said first means for withdrawing said member from the fruit to a point where the member just penetrates the rind, thereby permitting the member to conduct juice from the fruit during the ensuing compression of said fruit.

10. In a machine for dejuicing citrus fruit having channeled holders for receiving and supporting fruit and means for advancing said holders and progressively compressing the fruit therein to extract the juce, the improvement which comprises: a fruit puncturing and juice conduit member on each holder movable in said channel toward and from fruit resting on the holder, each holder being traversable through a fruit compression path, said member being actuated by means positioned along said path, said actuating means comprising (1) means at an initial stage of fruit compression for moving said member toward the fruit to puncture the rind and pulp structure thereof, (2) means adjacent said last named means for partially withdrawing said member from the fruit, thereby permitting said member to conduct juice from the fruit, and (3) means for maintaining said member in a juice-conducting position during the ensuing compression of the fruit.

11. In a machine for dejuicing citrus fruit having holders for supporting fruit and means for advancing and progressively compressing the fruit in said holders to extract the juice, the improvement which comprises: a fruit puncturing and juice conduit member on each holder movable toward and from fruit resting on the holder, each holder being traversable through a fruit compression path, said member being moved by means positioned along said path, said moving means including (1) means at an initial stage of fruit compression for moving said member toward the fruit to puncture the rind and pulp structure thereof, (2) means adjacent said last named means for partially withdrawing said member from the fruit, thereby permitting said member to conduct juice from the fruit, and (3) means for maintaining said member in a juice-conducting position during the ensuing compression of the fruit.

FRANCIS W. RAHRER.

REFERENCES CITED

The following references are of record in the file of this patent:

UNITED STATES PATENTS

| Number | Name | Date |
|---|---|---|
| 1,609,523 | McLaughlin | Dec. 7, 1925 |
| 1,925,196 | Maull | Sept. 5, 1933 |
| 1,985,323 | McCall | Dec. 25, 1934 |
| 2,420,679 | Pipkin | May 20, 1947 |